April 15, 1952   C. J. COBERLY   2,592,791
TURBINE CLAMP HAVING OPPOSITE IDENTICAL JAWS
Filed Feb. 27, 1948
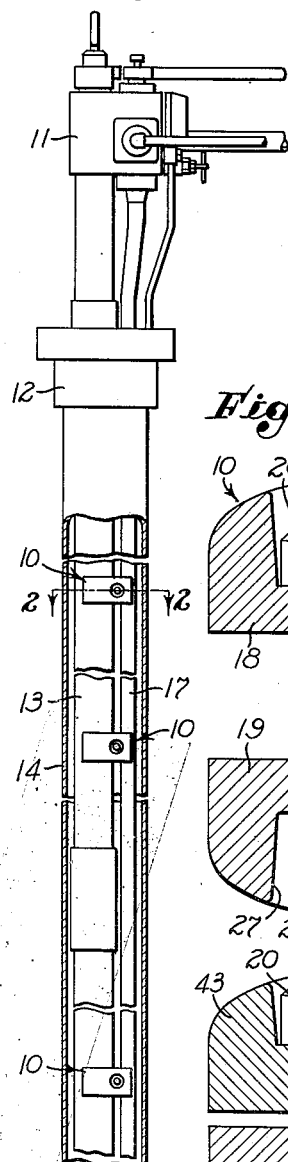
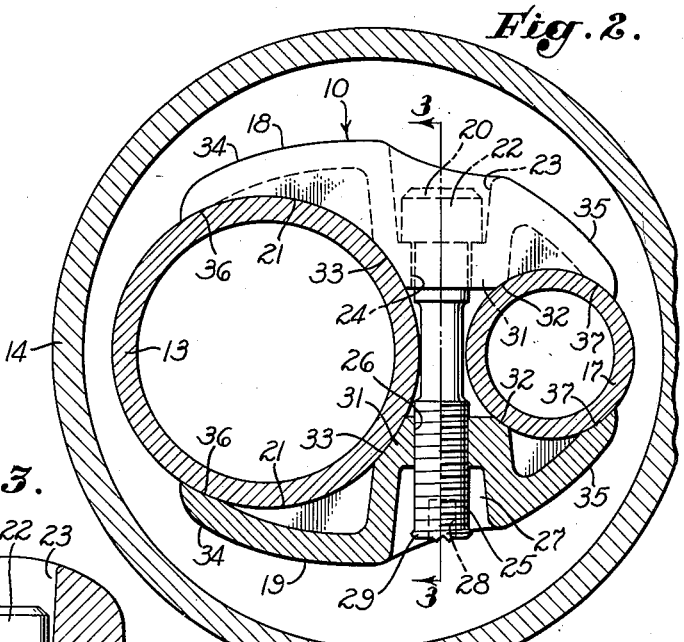
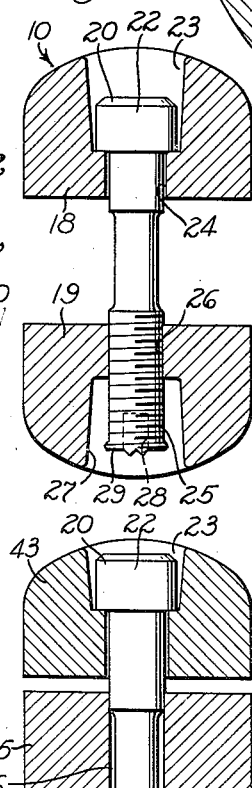
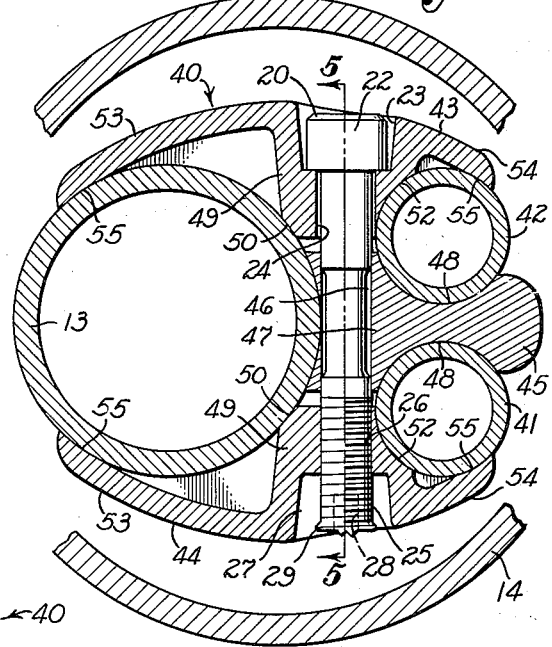
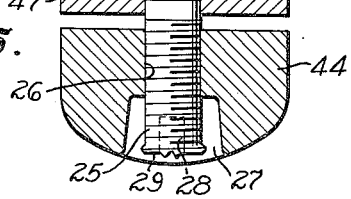
INVENTOR.
CLARENCE J. COBERLY
BY HIS ATTORNEYS.
HARRIS, KIECH, FOSTER & HARRIS Patented Apr. 15, 1952

2,592,791

UNITED STATES PATENT OFFICE 2,592,791

TUBING CLAMP HAVING OPPOSITE IDENTICAL JAWS

Clarence J. Coberly, Los Angeles, Calif., assignor, by mesne assignments, to Dresser Equipment Company, Cleveland, Ohio, a corporation of Ohio Application February 27, 1948, Serial No. 11,590

1 Claim. (Cl. 24—81)

My invention relates generally to improvements in tubing clamps and more particularly to a clamp adapted to maintain a plurality of tubings in a predetermined, parallel relationship to each other.

The tubing clamp which is the subject of the present invention is intended to be utilized in conjunction with a plurality of vertical tubings disposed within the confines of an oil well casing and is so constructed that it can be readily installed upon and removed from the tubings which it secures together.

An object of my invention is the provision of a clamp of this type which is of nominal size and nevertheless is adapted to secure a plurality of maximum size tubings together.

Another object of the present invention is the provision of a tubing clamp which grasps the tubings at four points on the periphery thereof, thus providing maximum security against the possible dislodgment of the clamp.

Another object of the present invention is the provision of a tubing clamp which is of streamlined configuration and divested of superfluous projections which might cause the clamp to be caught at the annular recess in the couplings between the ends of the joints of casing or projections in the interior of the well casing in the process of insertion or withdrawal of the tubings from an oil well.

Another object of my invention is the provision of a tubing clamp which is so constructed that, should it be inadvertently dislodged from its position about the tubings, will not fall off the tubings with the possibility of becoming wedged between the tubings and the inner wall of the well casing or otherwise lost in the casing. On the contrary, the clamp will maintain a sufficient hold upon the tubings to permit it to slide down until it impinges on a tubing collar or until it becomes wedged upon the tubings themselves.

Another object is to provide a clamp that is a unitary assembly which can be placed on the tubing by loosening a single bolt and which cannot be disassembled in the field thus avoiding any danger of dropping any of the component parts in the well.

Another object of my invention is the provision of a tubing clamp which comprises a minimum number of parts, is easy to assemble and manufacture and can be produced at comparatively low cost.

Other objects and advantages of my invention will become apparent upon a consultation of those embodiments which, for purposes of example alone, are described in the following specification and shown in the accompanying drawing, in which:

Fig. 1 is a vertical elevational view, partly in section, showing the manner in which clamps constructed in accordance with my invention are utilized to secure a plurality of tubings together within an oil well casing;

Fig. 2 is an enlarged horizontal partly cross-sectional view taken on broken line 2—2 of Fig. 1;

Fig. 3 is a vertical sectional view taken on broken line 3—3 of Fig. 2;

Fig. 4 is a horizontal cross-sectional view of another embodiment of a tubing clamp constructed in accordance with my invention, and Fig. 5 is a vertical cross-sectional view taken on broken line 5—5 of Fig. 4.

A tubing clamp 10, which is the subject of the present invention, is shown in Fig. 1 as it is utilized within an oil well to maintain a number of depending tubings in predetermined, parallel, spaced relationship. It is, of course, not intended that the clamp be limited to any such specific use, and it is shown as utilized in an oil well for purposes of illustration alone.

The general pumping system is shown and described in detail in Patent No. 2,338,903, issued January 11, 1944, to which reference is hereby made for the particulars thereof, and forms no part of the present invention. To facilitate understanding of the present invention, however, the pumping system will be generally described.

A four-way valve 11 which is mounted upon an oil well casing head 12 has connected thereto a power oil tube 13 which depends downwardly therefrom into an oil well casing 14. Positioned alongside the power oil tubing 13 is a production tubing 17 which is adapted to convey the spent power oil and the production oil to the four-way valve 11.

Because the power oil tubing 13 and the production tubing 17 depend downwardly within the confines of the oil well casing 14 for a considerable distance and to insure that both of the tubings 13 and 17 are kept in close contiguity to each other to prevent the bowing out of either of the tubings into contact with the well casing 14 as they are dropped therein or withdrawn therefrom a number of clamps 10, constructed in accordance with my invention, are installed about the periphery of tubings 13 and 17 longitudinally at spaced intervals.

The clamp 10, as shown in Figs. 2 and 3, comprises two symmetrical jaw members 18 and 19 which are held together in cooperative relationship by means of a bolt 20 or similar fastening means. A headed end 22 of the bolt 20 lies within a recess 23 formed in the side of the jaw member 18 and its shank portion passes through a hole 24 in the jaw member 18 which subtends the recess 23. A threaded end 25 of the bolt 20 is threadedly engaged within a hole 26 formed in the jaw member 19 and projects outwardly into a recess 27 similar in configuration to the recess 23 in the jaw member 18. By providing the recesses 23 and 27 for the reception of the opposite ends of the bolt 20 of sufficient depth the possibility that either end can project beyond the peripheral bounds of the clamp 10 and catch upon at the annular recess in the couplings between the ends of the joints of the casing or projections within the well casing 14 is avoided.

There is formed in the threaded portion 25 of the bolt 20 a recess 28 which is adapted to receive the end of a suitable swaging tool to permit the end of the bolt 20 to be swaged, as at 29. Thus, once the bolt 20 fastens the jaw members 18 and 19 together and the end of the bolt 20 is swaged, the jaw members 18 and 19 are inseparably joined together. Therefore, the possibility that one or the other of the jaw members might be misplaced or the bolt itself be dropped and lost is avoided.

When the clamp 10 is to be installed upon the tubings 13 and 17 the bolt 20 is unscrewed in the hole 26 in the jaw member 19 as far as it will go. Jaw members 18 and 19 are then disposed about the tubings 13 and 17 and the bolt 20 tightened until the jaw members 18 and 19 are pulled into engagement with the tubings 13 and 17. Notice should also be taken of the fact that the hole 24 in the jaw member 18 is oversize and the jaw member 18 is therefore allowed a certain amount of free movement upon the shank of the bolt 20. When the clamp 10 is assembled upon the tubings 13 and 17 and the jaw members 18 and 19 are drawn into contact with the tubings by tightening the bolt 20 the jaw member 18 will, because of the oversize hole 24, tend to adjust itself upon the bolt 20 until it conforms to the position assumed on the other side of the tubings by the jaw member 19. This is an important feature of the invention since it assures the proper alignment of the clamp 10 upon the tubings at all times.

As indicated above, the jaw members 18 and 19 of the clamp 10 are of symmetrical shape. Their inner or grasping surfaces are disposed in face to face relationship with each other and their external or peripheral configuration is roughly of ovoid cross section when both members are placed in contiguous and cooperative relationship by means of the bolt 20.

The jaw member 18 is provided at its inner central portion with an internally projecting boss 31 which has its opposite sides arcuately cut, as at 32 and 33, to permit an accurate and effective contact to be made with the external curvature of the tubings 13 and 17. As can be seen from Fig. 2 of the drawing the surface area of the arcuate cut in the boss 31 at 33 is considerably larger than that at 32 to permit the reception of a larger diameter tubing. Since both the jaw members 18 and 19 are of similar overall configuration the description of the internal grasping surfaces of the jaw 18 will suffice for a description of the identical but oppositely disposed grasping surfaces of the jaw member 19.

Projecting laterally from either side of the central portion of the jaw 18 are arcuate gripping portions 34 and 35. The gripping portion 34 is formed on a wide arc to permit a large diameter tubing to be grasped thereby while the gripping portion 35 is inscribed on a narrower arc to accommodate a tubing of smaller diameter. A slight arcuate cut is taken on the inner surface of the gripping portion 34, as at 36, to permit accurate registry and effective contact with the periphery of the tubing 13. A similar cut is made in the gripping portion 35 at 37 for the same purpose.

Therefore, when the jaw members 18 and 19 are assembled in contiguous and cooperative relationship through the intermediary of the bolt 20 their oppositely disposed identical inner surfaces contrive to securely support and restrain the tubings confined therein parallel and predetermined spatial relationship. The arcuate cuts 33 in the boss 31, as best shown in Fig. 2, provide a two-point suspension at the inner side of the peripheral circumference of the tubing 13 and the gripping portions 34, through their accurate contact with the periphery of the tubing 13 on its other side provide a two-point suspension there. Thus it can be said that the tubing 13 is supported and secured at four points on its peripheral circumference by the gripping portions within the clamp.

In a similar manner the arcuate cuts 32 on the opposite side of the boss 31 are brought into contact with the inner side of the tubing 17 while the gripping portions 35 with their accurate registry upon the opposite side of the tubing 17 provide additional support which contributes to the four-point suspension of the tubing 17 within that portion of the clamp 10.

As best shown in Fig. 2, the upper and lower edges 21 of the jaw members 18 and 19 will also grasp upon the periphery of the tubings 13 and 17 if the tubing is correct in size. Thus, the tubings will be securely held, not only by the inner gripping portions of the clamp 10 but also by the upper and lower edges thereof.

There is thus provided by this embodiment of my invention an adjustable, easily installed and removed clamp which, because of its interior configuration, is able to firmly secure two tubings of different sizes in predetermined parallel relationship with each other. Because of its streamlined exterior shape it is not apt to become wedged against the inner wall of the well casing nor can it, because of its design and structure, fall off the tubings and impede the removal of the tubings from the well casing.

There is shown in Fig. 4 another embodiment of my invention which is a clamp 40 designed to accommodate three tubings in predetermined parallel relationship. In this case the power oil tubing 13 is secured in one side of the clamp and in the opposite side of the clamp are located a spent power oil return tubing 41 and a production oil tubing 42.

Two oppositely disposed jaw members 43 and 44 are supported in cooperative relationship through the intermediary of a bolt 20 which has a headed portion 22 lying within a recess 23 formed in the central portion of the jaw member 43. The jaw members 43 and 44 are of substantially identical and symmetrical shape and a description of the shape of the jaw member 43 will suffice for the jaw member 44.

The shank portion of the bolt 20 passes through an oversize hole 24 formed in the jaw member 43 and its threaded portion 25 is engaged within a hole 26 formed in the jaw member 44 while its extreme end lies within a recess 27 formed in the central portion of the jaw member 44. The recesses 23 and 27 serve a similar function in the clamp 40 to that achieved by them in the clamp 10. A hole 28 is provided in the threaded portion of the bolt 20 and the end of the bolt is swaged, as at 29, by a suitable swaging tool.

Interposed between the jaw members 43 and 44 is a central member 45 which is supported upon the shank of the bolt 20 by means of a hole 46 formed in its base 47 through which the shank of the bolt 20 passes. The member 45 has formed in those opposite sides which face the inner surfaces of the jaw members 43 and 44 arcuate cuts 48 which are adapted to receive a portion of the peripheral circumference of the tubings 41 and 42 in a secure and accurate grip.

The jaw member 43 has an inwardly projecting central boss 49 which has arcuate cuts 50 and 52 formed in the lowermost portion of its opposite sides adapted to grip upon the outside of a tubing firmly and accurately. The arcuate cut 50 is of substantially larger radius than the arcuate cut 52 and the smaller tubings 41 and 42 have their center lines on either side of the center line of the tubing 13 whereas the tubings 13 and 17 in the clamp 10 are positioned on the same center line.

Projecting laterally from both sides of the central portion of the jaw member 43 are arcuate gripping members 53 and 54. The gripping member 53 is formed on a wider arc than the gripping member 54 to accommodate a tubing of larger dimensions than the gripping member 54 need accommodate. Slight arcuate cuts are formed on the inner surface of the gripping members 53 and 54, as at 55, to permit the surface in that area to conform to the configuration of the tubing with which it is in contact. The arcuate cuts 50 and 55 provide a four-point suspensory system on the interior surface of the jaw members 43 and 44 which is capable of supporting the tubing 13 securely within the clamp 40.

On the other side of the clamp 40 the spent power oil return tubing 41 is supported on one side by the arcuate cuts 52 and 55 formed in the interior surface of the jaw member 44 and on the other other side by the arcuate cut 48 formed in the side of the member 45. The production oil tubing 42 is supported on the other side of the member 45 and the interior surface of the jaw member 43 in a similar manner. The tubings 41 and 42 may be said to be supported at three points in this side of the clamp 40. The clamp 40 provides means for keeping three tubings in parallel alignment in little more space than is required by the clamp 10.

The installation of the clamp 40 upon the tubings 13, 41 and 42 is accomplished by unscrewing the bolt 20 in the hole 26 as far as it will go and thus spreading the jaw members 43 and 44 apart. The central member 45 is inserted between the tubings 41 and 42 as the jaw members are fitted to the tubings. Then the bolt 20 is drawn up until the inner surfaces of the jaw members 43 and 44 and the outer surfaces of the central member 45 are brought into clamping contact with the tubings 13, 41 and 42. As in the case of the clamp 10, the upper and lower edges of the jaw members 43 and 45 also contact the periphery of the tubings 13, 41 and 42 and serve to supplement the gripping effect of the inner portions of the clamp.

Clamp 40 is also of ovoid cross-sectional configuration and is so designed that there will be very little chance of its becoming wedged in the interstices in the oil well casing. A further advantage of the clamp 40 is that it will clamp three tubings in parallelism in the same size casing as the two tubings to which the clamp 10 is designed to be applied, with the fluid capacity of both systems about equal. For example, if the casing 14 is 5½ inch casing, the tubing 13 may be 2 inch tubing and the tubings 41 and 42 may be ¾ inch tubings, with substantially the same overall fluid capacity.

Since both the clamps 10 and 40 are so designed that their exterior surfaces are in close contiguity to the interior of the well casing 14, the well casing prevents the clamps from falling off the tubings if the bolt 20 should inadvertently become loosened. The loosening of the bolt 20 will only result in the slippage of the clamp down the tubings until it comes to rest upon another clamp or a tubing collar. Thus the possibility that the clamp could fall free of the tubings and become wedged between the tubings and the interior of the well casing is avoided.

I have disclosed above clamps constructed in accordance with my invention which are designed to restrain a plurality of tubings in parallelism and which are constituted of a minimum number of simple parts. The clamps are of such exterior configuration and construction that the possibility of their becoming caught in the casing wall is reduced to a minimum and they are so constituted that they cannot be dislodged from the tubings upon which they are mounted even though the bolt which secures them should become loosened. They are easily removed and installed and can be manufactured at moderate cost.

The embodiments of my invention which are shown in the drawings and described in the specification have been shown and described to illustrate the preferred manner of construction and mode of operation of the devices and to indicate the advantages inherent in their construction. I do not intend, however, to limit myself to the specific forms of the invention which I have shown and described since it is obvious that changes may be made in the details of construction and mode of operation of the invention which will, nevertheless, fall within the spirit and scope of the following claim.

I claim as my invention:

A clamp adapted to retain a plurality of tubings in parallelism with each other, including: a pair of jaw members, each of said jaw members having projecting from the central portion thereof laterally disposed, arcuate gripping portions; a central member located between said jaw members, said central member having a basal portion and a shank portion, said basal portion having a hole therein and being provided with an arcuate tubing seat and said shank portion being provided with oppositely disposed arcuate tubing seats; and fastening means securing said jaw members to each other, said fastening means passing through said hole in said central member to retain it between said jaw members.

CLARENCE J. COBERLY.

REFERENCES CITED

The following references are of record in the file of this patent:

UNITED STATES PATENTS

| Number | Name | Date |
|---|---|---|
| 1,040,620 | Clark | Oct. 8, 1912 |
| 1,261,582 | Mathias | Apr. 2, 1918 |
| 1,943,020 | Johnson | Jan. 9, 1934 |
| 1,953,709 | Gateka | Apr. 3, 1934 |
| 2,053,615 | Krueger | Sept. 8, 1936 |
| 2,081,047 | Basch | May 18, 1937 |
| 2,092,372 | Goeller | Sept. 7, 1937 |
| 2,223,191 | Sperbeck et al. | Nov. 26, 1940 |
| 2,426,857 | Birkenmaier | Sept. 2, 1947 |